United States Patent
Cazuc et al.

(10) Patent No.: US 9,834,313 B2
(45) Date of Patent: Dec. 5, 2017

(54) FRONT FRAME FOR A CASCADE THRUST REVERSER STRUCTURE

(71) Applicant: AIRCELLE, Gonfreville l'Orcher (FR)

(72) Inventors: Xavier Cazuc, Le Havre Rouelles (FR); Jean-Philippe Joret, Beuzeville (FR)

(73) Assignee: AIRCELLE, Gonfreville l'Orcher (FR)

(*) Notice: Subject to any disclaimer, the term of this patent is extended or adjusted under 35 U.S.C. 154(b) by 634 days.

(21) Appl. No.: 14/633,269

(22) Filed: Feb. 27, 2015

(65) Prior Publication Data

US 2016/0016669 A1    Jan. 21, 2016

Related U.S. Application Data

(63) Continuation of application No. PCT/FR2013/052011, filed on Sep. 2, 2013.

(30) Foreign Application Priority Data

Sep. 3, 2012   (FR) ..................... 12 58173

(51) Int. Cl.

| | |
|---|---|
| *F02C 6/00* | (2006.01) |
| *B64D 29/06* | (2006.01) |
| *F02K 1/72* | (2006.01) |
| *F01D 25/28* | (2006.01) |
| *F02K 1/70* | (2006.01) |

(52) U.S. Cl.
CPC ............ *B64D 29/06* (2013.01); *F01D 25/28* (2013.01); *F02K 1/70* (2013.01); *F02K 1/72* (2013.01); *F05D 2300/603* (2013.01); *Y02T 50/672* (2013.01)

(58) Field of Classification Search
CPC . B64D 29/06; F01D 25/28; F02K 1/70; F02K 1/72; F05D 2300/603; Y02T 50/672
See application file for complete search history.

(56) References Cited

U.S. PATENT DOCUMENTS 3,511,055 A * 5/1970 Timms ............... F02K 1/72
                                              239/265.29
4,373,328 A    2/1983 Jones
(Continued)

FOREIGN PATENT DOCUMENTS

FR    2 358 555 A1    2/1978
FR    2 965 589 A1    4/2012

OTHER PUBLICATIONS

International Search Report dated Dec. 20, 2013 in International Application No. PCT/FR2013/052011.

*Primary Examiner* — Jesse Bogue
(74) *Attorney, Agent, or Firm* — Burris Law, PLLC

(57) ABSTRACT

The present disclosure relates to a front frame for an aircraft nacelle comprising a turbojet mounted on a suspension strut, said nacelle comprising a thrust reverser including an actuator designed to open a thrust reversal cowling. The front frame comprises a tubular torsion box, a first straight attachment edge intended to attach the box to a turbojet casing and a second straight attachment edge intended to attach the box to air flow diversion means. The front frame is arranged to transmit tensile and compressive loads between the turbojet casing and the air flow diversion means and torsion loads absorbed by the suspension strut. The front frame is characterized in that the tubular torsion box has a semi-elliptical or elliptical cross-section.

11 Claims, 3 Drawing Sheets

(56) References Cited

U.S. PATENT DOCUMENTS

| | | | | |
|---|---|---|---|---|
| 4,564,160 | A * | 1/1986 | Vermilye | F02K 1/72 239/265.29 |
| 4,998,409 | A * | 3/1991 | Mutch | F02K 1/72 239/265.29 |
| 5,239,822 | A | 8/1993 | Buchacher | |
| 6,170,254 | B1 | 1/2001 | Cariola | |
| 7,484,355 | B2 * | 2/2009 | Blin | F02K 1/625 60/226.2 |
| 2008/0271432 | A1 * | 11/2008 | Tsou | F02K 1/72 60/226.2 |
| 2009/0151320 | A1 * | 6/2009 | Sternberger | F02K 1/72 60/226.2 |
| 2010/0212286 | A1 * | 8/2010 | West | F02K 1/32 60/226.2 |
| 2011/0062279 | A1 * | 3/2011 | Welch | B21D 39/03 244/54 |
| 2011/0233305 | A1 * | 9/2011 | Elegoet | F01D 25/28 239/265.19 |
| 2012/0256051 | A1 * | 10/2012 | Bellanger | F02K 1/72 244/110 B |
| 2012/0285138 | A1 * | 11/2012 | Todorovic | F02C 7/14 60/230 |
| 2013/0067885 | A1 * | 3/2013 | Suciu | F02K 1/70 60/226.2 |
| 2013/0078081 | A1 * | 3/2013 | Chakkera | F02K 1/64 415/150 |
| 2013/0126638 | A1 * | 5/2013 | Vauchel | F02K 1/72 239/265.19 |
| 2013/0161415 | A1 * | 6/2013 | Bellanger | F02K 1/72 239/265.19 |

* cited by examiner

FRONT FRAME FOR A CASCADE THRUST REVERSER STRUCTURE

CROSS-REFERENCE TO RELATED APPLICATIONS

This application is a continuation of International Application No. PCT/FR2013/052011, filed on Sep. 2, 2013, which claims the benefit of FR 12/58173, filed on Sep. 3, 2012. The disclosures of the above applications are incorporated herein by reference.

FIELD

The present disclosure relates to a front frame for a cascade-type thrust reverser structure for a nacelle of an aircraft and a nacelle including such a front frame.

BACKGROUND

The statements in this section merely provide background information related to the present disclosure and may not constitute prior art.

An aircraft is moved by several turbojet engines each housed in a nacelle also accommodating an assembly of additional actuating devices related to its operation and ensuring various functions when the turbojet engine is in operation or stopped. These additional actuating devices comprise a mechanical thrust reverser system.

More precisely, a nacelle generally has a tubular structure comprising an air inlet upstream of the turbojet engine, a middle section intended to surround a fan of the turbojet engine, a downstream section accommodating the thrust reversal means and intended to surround the combustion chamber of the turbojet engine, and is generally terminated by an ejection nozzle the outlet of which is situated downstream of the turbojet engine.

Modern nacelles are intended to accommodate a double flow turbojet engine capable of generating through the blades of the rotating fan a hot air flow (also called primary flow) coming from the combustion chamber of the turbojet engine, and a cold air flow (secondary flow) which circulates outside the turbojet engine through an annular channel, also called flow path, formed between a fairing of the turbojet engine and an inner wall of the nacelle. The two air flows are ejected out of the turbojet engine from the rear of the nacelle.

The role of a thrust reverser during landing of an aircraft is to improve the braking ability of the aircraft by redirecting forward at least a part of the thrust generated by the turbojet engine. In this phase, the thrust reverser obstructs the annular channel of the cold air flow and directs the latter to the front of the nacelle, thereby generating a counter-thrust which adds to the braking of the wheels of the aircraft.

The means implemented to achieve this cold air flow redirection vary depending on the thrust reverser type. However, in all cases, the structure of a thrust reverser comprises movable cowls displaceable between, on the one hand, a deployed position in which they open a passage within the nacelle intended for the diverted flow, and on the other hand, a retracted position in which they close this passage. These cowls may fulfill a function of deflection or simply actuation of other diverting means.

In the case of a cascade-type thrust reverser, also known under the name of cascade thrust reverser, the air flow redirection is carried out by cascades vanes associated with reverser flaps, the cowl slides aiming to uncover or cover the cascade vanes. The reverser flaps form blocking doors activated by the sliding of the cowling generally generating a closing of the annular channel downstream of the cascades in order to optimize the redirection of the cold air flow.

Generally, the cascade vanes are attached to the casing of the turbojet engine and to the middle section of the nacelle using a front frame.

The common front frames include a multitude of parts.

More precisely, a common front frame includes a generally triangular cross-sectional torsion box comprising a lower wall connecting two upstream and downstream walls, the assembly forming the triangular section.

On the lower wall are brought a plane first upstream attachment edge intended to attach said box to a fan casing and an also plane second downstream attachment edge intended to attach said box to the cascade vanes.

The front frame comprises, in addition, a panel ensuring the fire resistance of the front frame and allowing to fasten the front frame to the outer cowl of the middle section.

This panel is brought on the upstream and/or downstream wall(s) of the torsion box.

The lower wall of the torsion box is subjected to tensile loads generated by the mounting of the cascade vanes on the torsion box.

Moreover, the actuators driving the thrust reverser cowl in these movements between its different positions being mounted on the front frame, the latter is subjected to a torque that should be transmitted efficiently from the actuators toward a suspension mast on which the nacelle is mounted.

It is known that the most adapted structures for transmitting a torque are the tubular structures while for tensile and compressive loads, a plane structure is preferable.

A good compromise of torsion box to fulfill these functions is a tubular torsion box, of triangular cross section, associated with an adapted plane portion, in the lower portion of the box.

The plane walls of the torsion box, the angular vertices between these walls and the plate promote the transmission of the tensile loads of the cascade vanes towards the turbojet engine casing, this by aligning to the different load paths of the tensile loads transmitted from the cascade vanes to the turbojet engine casing.

SUMMARY

The present disclosure includes a front frame for an aircraft nacelle comprising a turbojet engine mounted on a suspension mast, the nacelle comprising a thrust reverser comprising at least one actuator adapted to open a thrust reverser cowl, said frame including a tubular shaped torsion box, a first straight attachment edge intended to attach said box on a turbojet engine casing and a second straight attachment edge intended to attach said box to air flow diverting means, said frame being arranged to transmit tensile and compressive loads between the turbojet engine casing and the air flow diverting means and torsion loads absorbed by the suspension mast.

This front frame is remarkable in that the tubular torsion box has a semi-elliptical or elliptical cross section.

Thanks to the present disclosure, the transmission of the torsion torque is improved while maintaining an improved transmission of the tensile/compressive loads to which the torsion box is subjected, this by limiting the mass of the front frame as well as reducing the number of parts to be assembled.

According to other features of the present disclosure, the front frame of the present disclosure includes one or more of the following optional features considered alone or in any possible combinations:

- the first and second attachment edges are diametrically opposite with respect to the box so as so transmit the tensile loads between the turbojet engine casing and the air flow diverting means;
- the front frame comprises a straight structure comprising the first and second edges so as so transmit the tensile loads between the turbojet engine casing and the air flow diverting means;
- the tubular torsion box having a semi-elliptical shaped section, said straight structure forms the basis of the semi-ellipse;
- the tubular torsion box has a semi-circular shaped section;
- the tubular torsion box having an elliptical shaped section, said straight structure passes through the box;
- the tubular torsion box has a circular shaped section;
- the torsion box comprises a core coated with a composite material;
- the torsion box is integrally made of a composite material;
- the front frame comprises a panel intended to attach said torsion box to a middle section of the nacelle, said panel forming a part integral with the casing.

According to yet another aspect, the present disclosure includes a nacelle including a thrust reverser fitted with a front frame according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
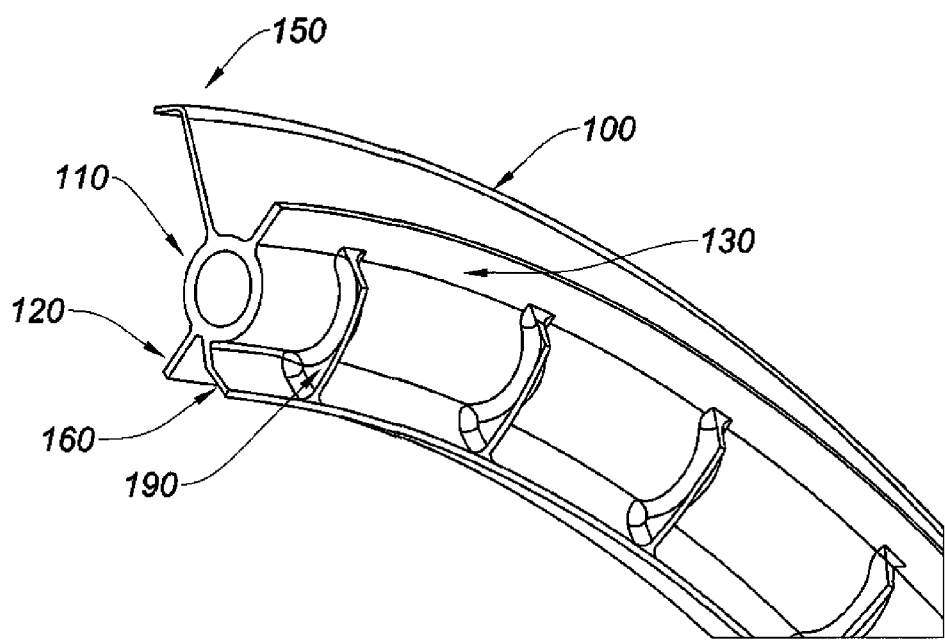
FIG. 1 is a perspective view of a first form of a front frame according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In general, a nacelle is intended to constitute a tubular housing for a double flow turbojet engine with large rate of dilution and serves to channel the air flows that it generates through the blades of a fan, namely a hot air flow passing through a combustion chamber of the turbojet engine, and a cold air flow circulating outside the turbojet engine.

More precisely, a nacelle comprises an upstream air inlet structure, a middle section surrounding a fan of a turbojet engine, and a downstream section.

The nacelle is of tubular shape with a longitudinal axis. Thus, "longitudinal" means here a direction substantially collinear with the longitudinal axis of the nacelle. Here, "cross" means a direction substantially perpendicular to the longitudinal axis of the nacelle.

The downstream section includes in a manner known per se an outer structure, called OFS, accommodating thrust reversal means, and an inner structure, called IFS. The nacelle is fixed downstream through any appropriate means, in particular connecting rods, to a suspension mast intended to fasten the nacelle under an aircraft wing.

The inner structure is intended to cover a downstream portion of the turbojet engine extending downstream of the fan so as to delimit an annular channel for the passage of the hot air flow.

The outer structure and the inner structure also define another annular flow channel or flow path for the cold air flow.

In a more precise way, the thrust reversal means of the downstream section include at least one mobile cowl covering cascade vanes (indicated by reference 1 in particular in FIG. 2) and driven in translation upstream and/or downstream of the nacelle through one or several actuator(s).

These actuators transmit tensile and compressive loads in the outer fixed structure of the nacelle.

The cascade vanes 1 are connected to the middle section and to the turbojet engine casing through the front frame 100 of the present disclosure.

Referring to FIG. 1, the front frame 100 of the present disclosure comprises at least:
- a tubular shaped torsion box 110,
- a first attachment edge 120 of straight cross-section intended to attach said box on the turbojet engine casing and,
- a second attachment edge 130 of straight cross-section intended to attach said box 110 to the air flow cascade vanes 1.

The front frame 100 is arranged to transmit tensile and compressive loads between the turbojet engine casing and the air flow cascade vanes 1.

The position of the air flow cascade vanes 1 and of the actuators mounted on the front frame 100, with respect to the connection of the front frame 100 on the turbojet engine casing generates torsion loads in the front frame 100.

More particularly, the tubular element 110 has a generally semi-ring or ring-centered shape on the longitudinal axis of the nacelle.

The axis of the tubular element 110 may be curved in a semi-circular direction to conform to the outer curves of the turbojet engine.

Advantageously, in a first form illustrated in FIG. 1, the tubular torsion box 110 has an elliptical, and more particularly circular, cross-section.

Figure 3:
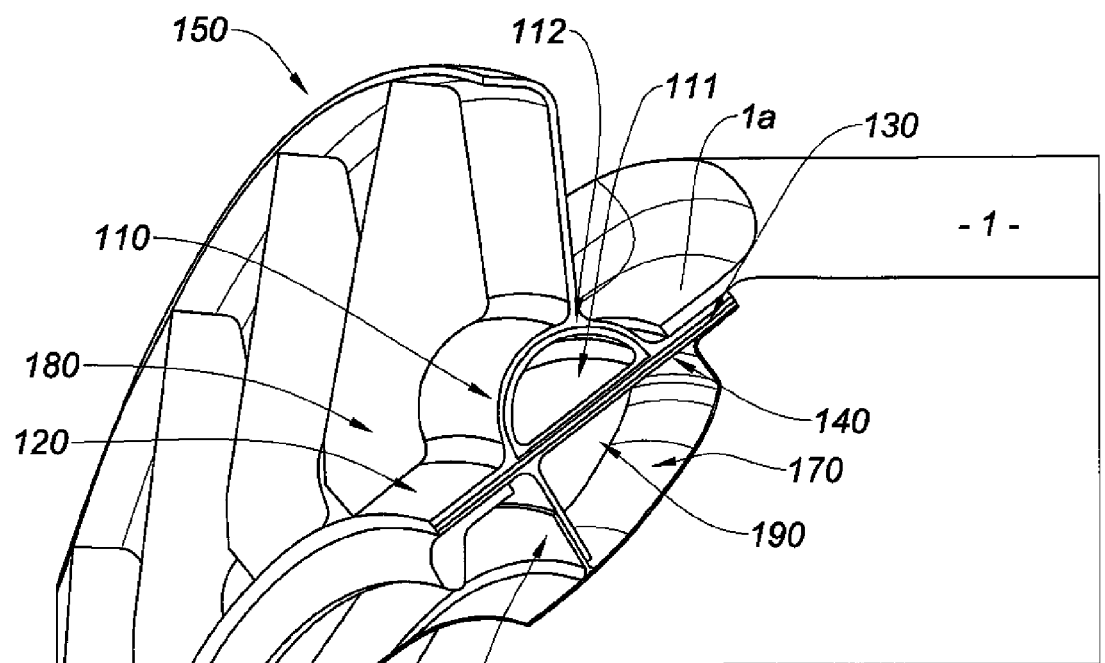
FIGS. 3 and 4 are respectively perspective views of a second and a third form of a front frame of the present disclosure.

In a second form illustrated in FIG. 3, the tubular torsion box 110 has a semi elliptical, and more particularly semi-circular, cross-section.

Advantageously, this elliptical or semi elliptical cross section of the tubular torsion box 110 allows to take the loads of the actuators generated in the fixed structure of the nacelle, which are not aligned on the second attachment edge 130.

More particularly, this elliptical or semi elliptical cross section of the tubular torsion box 110 provides good performance to mass ratio, for a same flow of load to which the fixed structure of the nacelle is subjected.

This elliptical or semi-elliptical geometry proves to be the more efficient and allows to achieve a mass gain with respect to a triangular or trapezoidal shape.

Concerning the first attachment edge 120, it is formed projecting outwardly from the outer circumference of the torsion box 110.

It allows a mounting function on the motor casing while allowing an opening of the corresponding thrust reverser.

It has a conical or cylindrical shape.

It is adapted to cooperate with a half ring 2 named knife or J-ring mounted at its upstream end and forming a male portion of a connecting device between the front frame and the fan casing of the turbojet engine. This part can thus have a substantially J-shaped longitudinal section to cooperate with a complementary shape carried by the fan casing called V-groove.

In a variant, the ring 2 is not brought on the first attachment edge 120 but formed of a single part with this first attachment edge 120. It is thus configured to directly receive the turbojet engine casing.

Concerning the second attachment edge 130 intended to attach said box 110 to the air flow cascades vanes 1, it is also formed projecting outwardly from the outer circumference of the torsion box 110.

It provides for the front frame 100 a transmitting function of the loads coming from the cascades 1 toward the turbojet engine casing in the reversion mode of the cold air flow as directly as possible in order to avoid unwanted loads. This second attachment edge 130 has a conical or cylindrical shape.

It is adapted to cooperate with an upstream end of a support frame 1a of the air flow cascade vanes 1.

In order to provide improved transmission of tensile and compressive loads between the cascade vanes 1 and the turbojet engine casing, the front frame 100 has first and second attachment edges 120, 130 diametrically opposite with respect to the torsion box 110.

Figure 4:
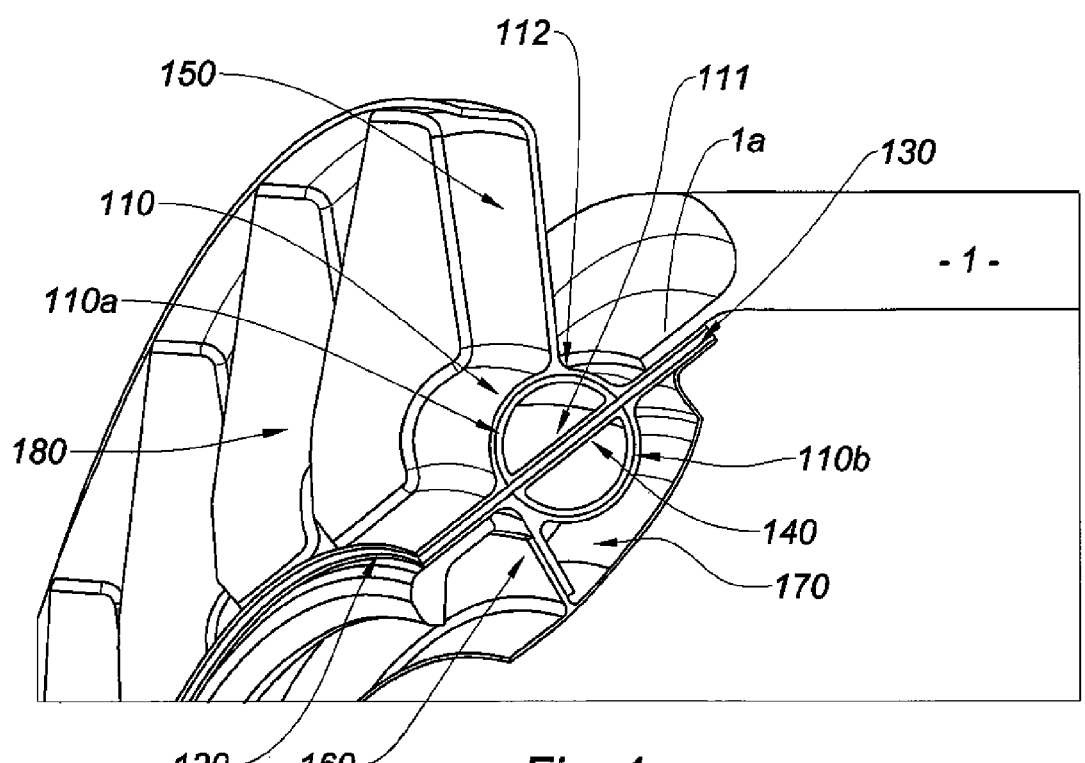

In second and third forms illustrated in FIGS. 3 and 4, the front frame 100 comprises a structure of straight cross-section 140 forming a conical plate 140 comprising the first 120 and second 130 leading edges and connecting them to transmit the tensile loads between the turbojet engine casing and the air flow cascade vanes 1.

This conical plate 140 extends in a straight direction, and thus, is configured to connect to the cascade vanes 1 and to the turbojet engine casing, through the corresponding attachment edges 120, 130.

Figure 2:
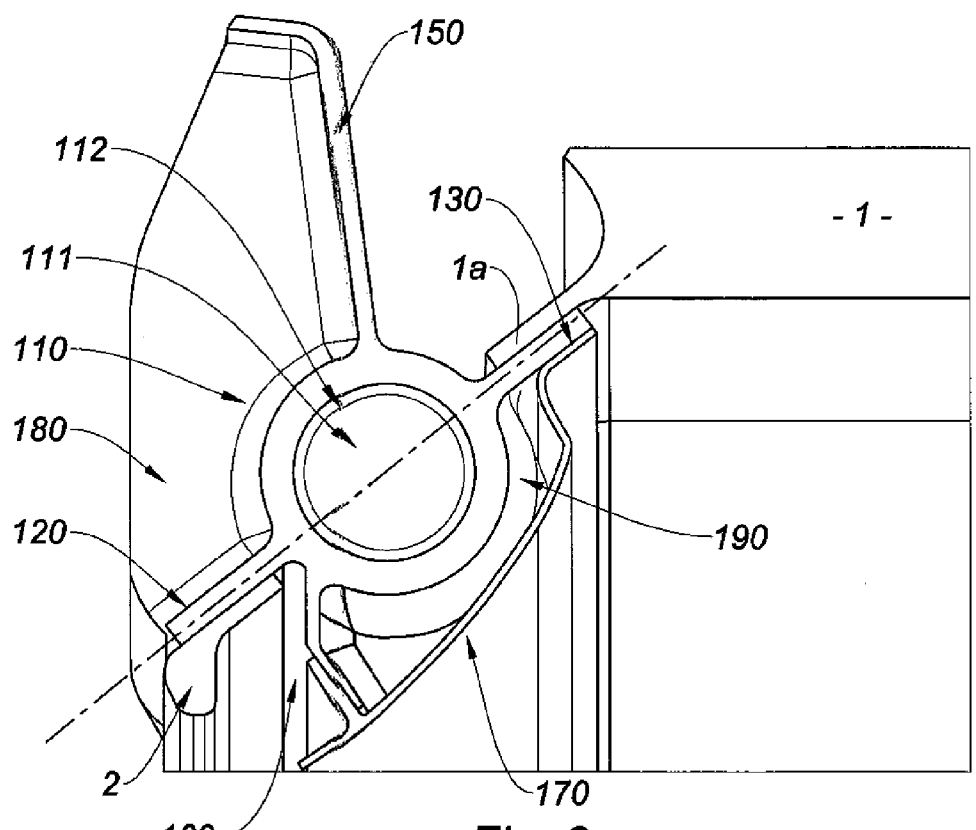
FIG. 2 is a perspective and cross-sectional view of the front frame of FIG. 1 on which flow cascade vanes are brought.

In the form of FIG. 2, the conical plate 140 forms the basis of the semi-ellipse of the torsion box 110.

In the form of FIG. 3, the conical plate 140 passes through the torsion box 110.

More particularly, in one variant of this form, the torsion box 110 may be formed by a tubular element of circular section formed by two elements 110a and 110b of semi-circular section and of a conical plate 140 at the interface of these two elements.

Furthermore, the front frame 100 comprises a wall 150 intended to serve as interface with the fan cowl, this in order to withstand the loads coming from the fan cowl, clamping and supporting effect of the cowl.

This wall 150 allows in addition to create a compartment for providing fire resistance of the assembly. It can thus contain the fire in case of flame in the compartment delimited by the motor casing, the fan cowl and the wall 150.

This wall 150 is formed projecting from the outer circumference of the torsion box 110, in the direction of the outer cowl.

This wall 150 is substantially straight over most of its length.

It comprises at its end near the outer cowl (not shown), a longitudinal fold or return, in order to rest on the cowl and to be fixed thereto.

Referring to FIGS. 1 and 2, the front frame 100 comprises a third attachment edge 160 projecting outwardly from the torsion box 110 and adapted to provide fixing a secondary structure 170 ensuring the deflection edge function on the torsion box 110 so as to define an aerodynamic continuity of the flow in the thrust reversal phase, in order to avoid a flow separation.

The front frame 100 may comprise, in addition, cross stiffeners 180 connecting the wall 150 of fire resistance, a portion of the circumference of the torsion box 110 and the first attachment edge 120.

It may comprise, in addition, cross stiffeners 190 connecting the second attachment edge 130, a portion of the circumference of the torsion box 110 and the third attachment edge 160 to the deflection edge.

Furthermore, the front frame 100 formed by the fire resistance panel 150, the torsion box 110 and the attachment edges 120, 130 form a single integral part. In one form, they are made in a composite material, which allows lightening the mass of the front frame 100.

In this context, in a variant, the torsion box 110 comprises a metallic core 111 coated with a composite material 112.

In variant, the torsion box 110 comprises a composite core 111 coated with a composite material 112 that is to say it is integrally made of a composite material.

More generally, the front frame 100 comprises a torsion box 110 formed of an assembly:
  of one or more layer(s) of material forming the tubular core 111
  of one or more layer(s) 112 called outer layer(s) of composite material adapted to coat the tubular core.

Advantageously, these outer layers form, in addition, the fire resistance panel 150 and the first and second attachment edges 120, 130.

They handle a part of the loads to be transmitted between the cascade vanes and the turbojet engine casing.

Similarly, they handle a part of the loads to be transmitted between the actuators and the turbojet engine casing.

They further transmit the torsion loads toward the suspension mast (via suspension beams 12h). These outer layers allow to connect, continuously and integrally the wall 150, a part of the core circumference of the torsion box 110 and the first attachment edge 120.

Thus, the fibers 112 of the outer layers are continuous from one end of the fire resistance wall 150 near the outer cowl up to the first attachment edge 120, passing through the coating of the tubular core 111.

In addition, they allow to continuously and integrally connect the outer panel 150, a part of the core circumference of the torsion box 110 and the second attachment edge 120.

Thus, the fibers 112 of the outer layers are continuous from one end of the fire resistance panel 150 near the outer cowl up to the second attachment edge 130, passing through the coating of the tubular core 111.

In addition, in one form, they allow to continuously and integrally connect the first attachment edge 120, the second attachment edge 120 and the core of the torsion box 110.

Thus, the fibers 112 of the outer layers are continuous from the first attachment edge 120, up to the second attachment edge 130, passing through the coating of the tubular core 111.

In the variant in which a plate 140 passes through the box 110, the fiber layers of the plate 140 are continuous from the first attachment edge 120 up to the second attachment edge 130.

Thanks to this particular shape of the torsion box 110 associating tubular core 111 and elliptical or semi elliptical cross-section in which we replace the plane walls of the box and the angular portions of the torsion box of triangular section of the prior art, we improve the transmission of the torsion torque toward the suspension mast while maintaining an improved transmission of the tensile/compressive loads to which the torsion box is subject by the presence of plane elements allowing the alignment of material fibers with the tensile/compressive loads.

The mechanical strength of the front frame of the present disclosure against the stresses is further improved.

Such a front frame 110 can be obtained, for example, by a method called method of infusion or of resin injection using a bladder or a rigid counter mold.

According to another variant, it may be obtained by injection of the resin in the thickness and not in the fibers direction, as is the case in the RTM method.

It is also possible to use a draping method consisting of draping resin pre-impregnated plies on a mold and to proceed to a baking at a temperature above 100° C.

Figure 5:
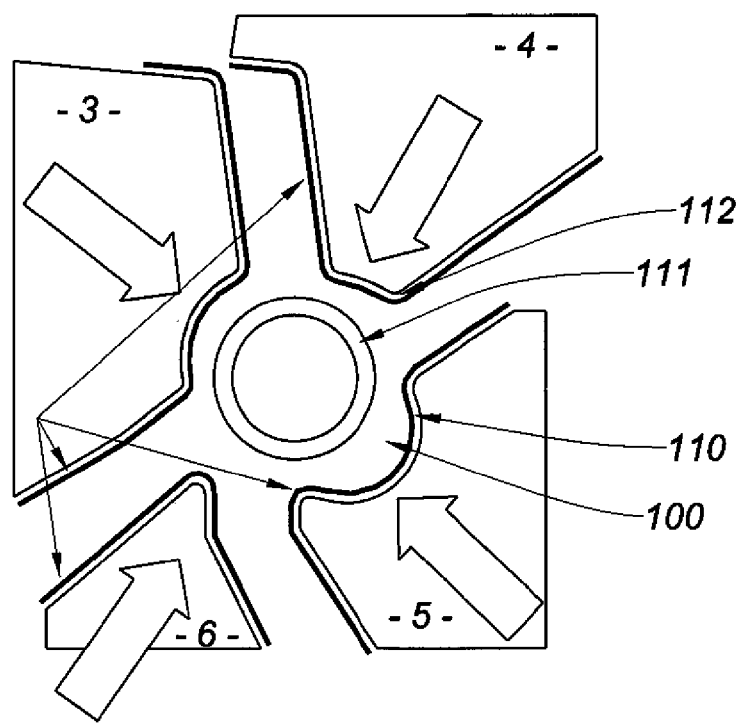
FIGS. 5 and 6 illustrate two successive steps of a manufacturing method of a front frame according to the first form.
Figure 6:
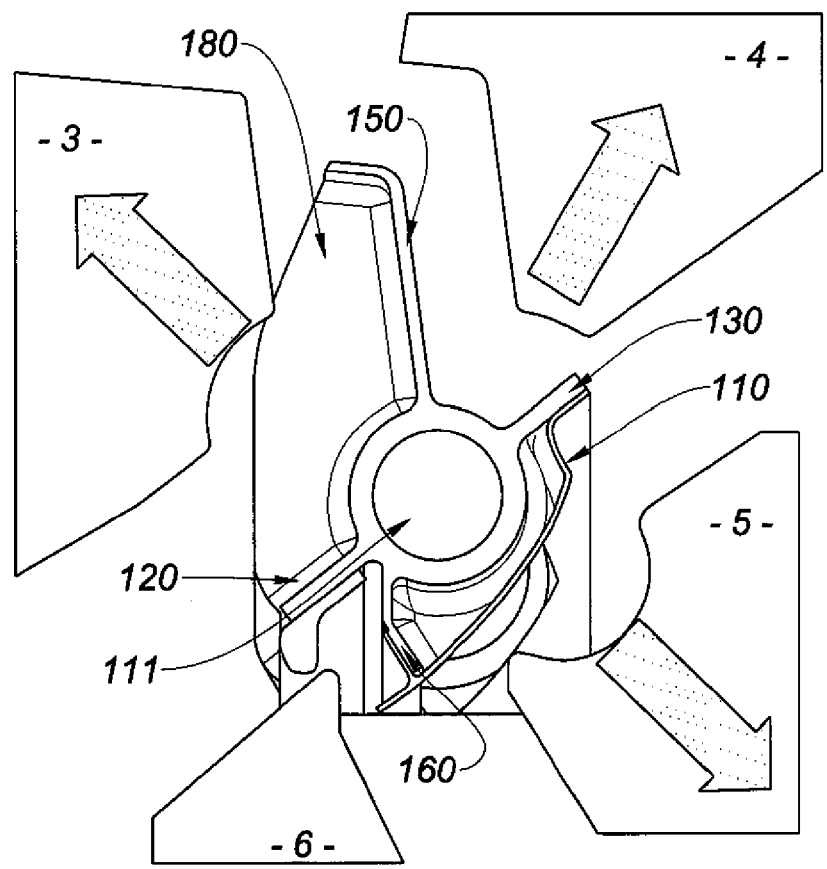

More precisely, in FIGS. 5 and 6, a non-limiting form of a manufacturing method of a front frame 110 is observed according to the present disclosure by resin transfer.

This method provides, without limitation, for four portions of the following counter molds, forming the constituent parts of the mold of a front frame 100 according to the present disclosure:
- a counter mold 3 forming the counter shape of the wall 150, of a portion of the outer circumference of the core and of the first attachment edge 120;
- a counter mold 4 forming the counter shape of the wall 150, of a portion of the outer circumference of the core 111 and of the second attachment edge 130;
- a counter mold 5 forming the counter shape of the second attachment edge 130, of a portion of the outer circumference of the core 111 and of the third attachment edge for deflection edge;
- a counter mold 6 forming the counter shape of the first attachment edge 120 and of the third attachment edge for deflection edge.

Thus, in a step illustrated in FIG. 5, the counter molds of fiber plies forming the outer layers of the front frame 100, are draped.

The four counter molds are closed against the tubular core of the torsion box, made of metallic or composite material, so as to completely and complementarily coat it.

The resin is injected and the assembly is baked so as to make the different constituent elements of the front frame 100 monobloc.

In a subsequent step illustrated in FIG. 6, the counter molds are removed to clear the formed front frame 100.

It should be noted that in variants, the third attachment edge may be brought and/or stiffeners may be formed in a single part with the torsion box 110.

Moreover, the materials used can be any known material.

The composite material is typically selected from carbon fiber, glass fiber, aramid fiber-based materials or a mixture of these materials with an epoxy resin or bis-maleimide (BMI), which allows to provide both a lightening of the mass of the front frame of the present disclosure 121 and also to provide sufficient mechanical strength.

It can be seen that the front frame of the present disclosure has a reduced number of elements compared to the prior art. Reducing the number of elements forming the front frame of the present disclosure allows reducing the mass, and the manufacturing costs. The manufacturing methods are simple and fast, well adapted for a manufacture on production line.

What is claimed is:

1. A front frame for an aircraft nacelle comprising a tubular shaped torsion box, a first straight attachment edge attaching said tubular shaped torsion box on a turbojet engine casing and a second straight attachment edge attaching said tubular shaped torsion box to air flow cascade vanes, said front frame being arranged to transmit tensile and compressive loads between a turbojet engine casing and the air flow cascade vanes and torsion loads absorbed by a suspension mast wherein the tubular torsion box has a semi-elliptical or elliptical cross-section and the first straight attachment edge and the second straight attachment edge project outwardly from an outer circumference of the tubular torsion box and form a single integral part with the tubular torsion box, and further comprising cross stiffeners connecting a portion of the outer circumference of the tubular torsion box and the first straight attachment edge.

2. The front frame according to claim 1, wherein the first and second straight attachment edges are diametrically opposite with respect to the box so as to transmit the tensile loads between the turbojet engine casing and the air flow diverting means.

3. The front frame according to claim 1, wherein the front frame comprises a straight structure comprising the first and second edges so as to transmit the tensile loads between the turbojet engine casing and the air flow diverting means.

4. The front frame according to claim 3, wherein the tubular torsion box having a semi-elliptical shaped section, said straight structure forms the basis of the semi-ellipse.

5. The front frame according to claim 4, wherein the tubular torsion box has a semi-circular shaped section.

6. The front frame according to claim 3, wherein the tubular torsion box shape having an elliptical shaped section, said straight structure passes through the box.

7. The front frame according to claim 6, wherein the tubular torsion box has a circular shaped section.

8. The front frame according to claim 1, wherein the torsion box comprises a core coated with a composite material.

9. The front frame according to claim 8, wherein the torsion box is integrally made of composite material.

10. The front frame according to claim 1, wherein the front frame comprises a wall to attach said torsion box to a middle section of the nacelle, said wall forming a part integral with the torsion box.

11. A nacelle including a thrust reverser fitted with a front frame according to claim 1.

* * * * *